United States Patent
Smith et al.

(10) Patent No.: US 7,414,809 B2
(45) Date of Patent: Aug. 19, 2008

(54) SERVO WRITING USING RADIALLY OVERLAPPED SERVO SEGMENTS

(75) Inventors: S. Craig Smith, Sunnyvale, CA (US); Stan Shepherd, Morgan Hill, CA (US); Yu Sun, Fremont, CA (US); Yuan Roy Chen, San Jose, CA (US); Lin Guo, Saratoga, CA (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 11/750,820

(22) Filed: May 18, 2007

(65) Prior Publication Data

US 2008/0030889 A1    Feb. 7, 2008

Related U.S. Application Data

(60) Provisional application No. 60/747,769, filed on May 19, 2006.

(51) Int. Cl.
*G11B 5/596* (2006.01)
(52) U.S. Cl. .................................... 360/77.08
(58) Field of Classification Search ........................ None
See application file for complete search history.

(56) References Cited

U.S. PATENT DOCUMENTS

| | | | |
|---|---|---|---|
| 5,668,679 A | 9/1997 | Swearingen et al. | |
| 6,507,450 B1 | 1/2003 | Elliott | |
| 6,519,187 B2 | 2/2003 | Wada | |
| 6,731,446 B2 | 5/2004 | Ikeda et al. | |
| 6,965,491 B1 | 11/2005 | Perlmutter et al. | |
| 6,977,789 B1 | 12/2005 | Cloke | |
| 6,985,316 B1 | 1/2006 | Liikanen et al. | |
| 6,987,636 B1 | 1/2006 | Chue et al. | |
| 6,992,848 B1 | 1/2006 | Agarwal et al. | |
| 7,088,533 B1 | 8/2006 | Shepherd et al. | |
| 7,116,511 B2 * | 10/2006 | Ehrlich ........................ | 360/75 |
| 7,145,744 B1 | 12/2006 | Clawson et al. | |
| 7,167,333 B1 | 1/2007 | Liikanen et al. | |
| 7,206,157 B2 | 4/2007 | Ehrlich | |
| 7,209,312 B1 | 4/2007 | Sutardja | |
| 2006/0171058 A1 | 8/2006 | Chan et al. | |

* cited by examiner

*Primary Examiner*—K. Wong
(74) *Attorney, Agent, or Firm*—Fellers, Snider, et al.

(57) ABSTRACT

In accordance with various embodiments, initial servo data are written to a storage medium as a series of radially overlapped spiral segments. Final servo data are thereafter written to the medium while concurrently servoing on said overlapped segments.

20 Claims, 8 Drawing Sheets

SERVO WRITING USING RADIALLY OVERLAPPED SERVO SEGMENTS

RELATED APPLICATIONS

The present application makes a claim of domestic priority to U.S. Provisional Patent Application No. 60/747,769 filed May 19, 2006.

BACKGROUND

The present case is generally directed to servo data and more particularly, to the writing of final servo data based on initial servo data. Servo data are often used in a control system to provide feedback positional control for a control object. In the environment of a data storage device, such data can be used to detect and control the position of a read/write transducer adjacent a rotatable storage medium.

The servo data can be provided in a number of ways. In one approach, a servo track writer engages a data storage device to write an initial set of servo data to the storage media mounted therein. The initial servo data can take a number of forms, such as a series of spaced apart, continuous spirals that extend across the media surfaces in helical fashion from an outermost diameter (OD) to an innermost diameter (ID). Final servo data are thereafter written using the initial servo data as a prewritten positional reference.

SUMMARY

In accordance with various embodiments, initial servo data are written to a storage medium as a series of radially overlapped spiral segments. Final servo data are thereafter written to the medium while concurrently servoing on said overlapped segments.

In accordance with some embodiments, a method generally comprises generating spaced apart, first servo spirals on a storage medium with a radial width less than an overall radial width of the medium; writing spaced apart, second servo spirals to the medium that overlap the first servo spirals along an overlap region; and writing final servo data to the medium while servoing on both the first and second servo spirals in the overlap region.

In accordance with other embodiments, an apparatus generally comprises a data transducer adjacent a storage medium; and a controller configured to generate spaced apart, first servo spirals on a storage medium with a radial width less than an overall radial width of the medium, to write spaced apart, second servo spirals to the medium that overlap the first servo spirals along an overlap region, and to write final servo data to the medium while servoing on both the first and second servo spirals in the overlap region.

DETAILED DESCRIPTION

Figure 1:
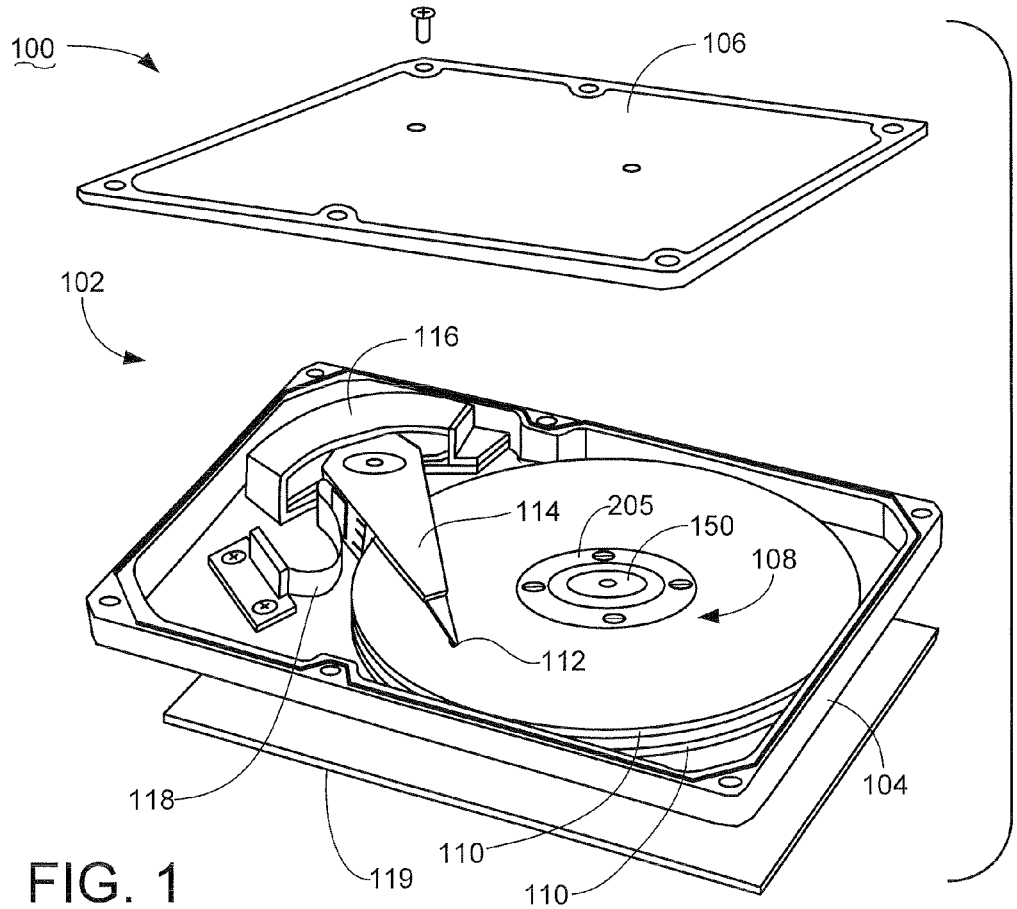
FIG. 1 is an exploded isometric view of an exemplary data storage device.

FIG. 1 generally illustrates a data storage device 100 to provide an exemplary environment in which various embodiments of the present invention can be advantageously practiced. The device 100 includes a housing 102 formed from a base deck 104 and top cover 106. An internally disposed spindle motor 108 is configured to rotate a number of storage media 110. An array of read/write transducers (heads) 112 access data tracks defined on the defined on the media surfaces to transfer data between the media 110 and a host device.

An actuator 114 moves the transducers 112 through application of current to a voice coil motor (VCM) 116. A flex circuit assembly 118 provides electrical communication paths between the actuator 112 and device control electronics on an externally disposed printed circuit board (PCB) 119.

Figure 2:
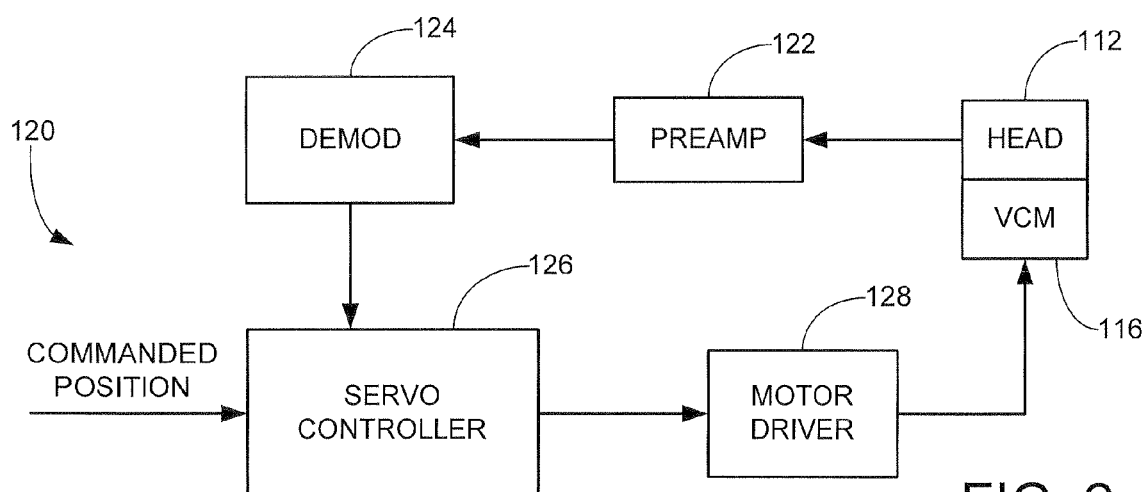
FIG. 2 provides a functional representation of a servo control circuit of the device of FIG. 1.

FIG. 2 provides a generalized functional block diagram for a closed loop servo control circuit 120 of the device 100. Embedded servo data are transduced from the media 110 by a selected transducer 112 and provided to a preamplifier/driver (preamp) circuit 122. The preamp circuit 122 preamplifies and filters the readback signals from the transducer 112, and provides the processed servo data to a demodulation (demod) circuit 124.

The demod circuit 124 detects and conditions the servo data, including application of automatic gain control (AGC) and conversion of the signals to digital form. A servo controller 126 processes the digitized servo data to generate a current command signal that is supplied to a motor driver circuit 128. In response, the driver circuit 128 applies the appropriate current to the VCM 116 to position the transducer 112.

The servo controller 126 is preferably characterized as a programmable processor with associated servo code to direct the operation of the servo loop, although the controller can take other forms including being partially or fully realized in hardware. The controller 126 generally operates in two primary modes, seeking and track following. Seeking generally involves controlled movement of the selected transducer 112 from an initial track to a destination track. Track following generally comprises operation of the controller 126 to maintain the selected transducer 112 over the center (or other commanded position) a selected track in order to carry out data 110 operations with the track.

Figure 3:
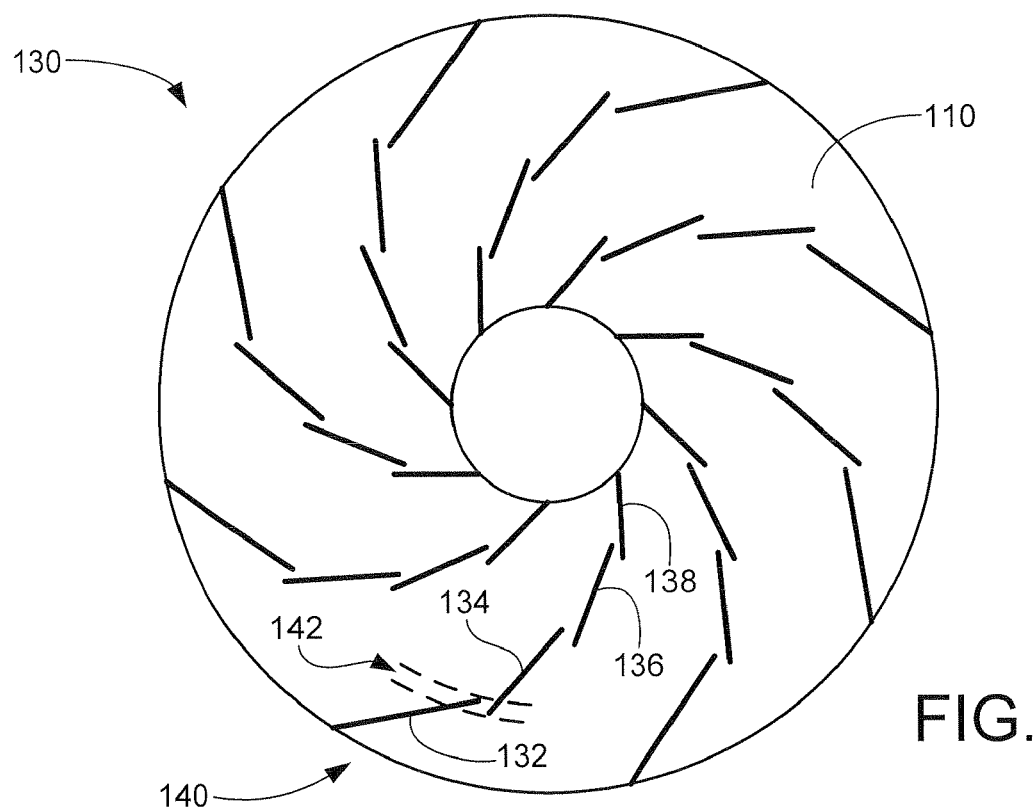
FIG. 3 generally illustrates initial servo data written to a medium of the device of FIG. 1 as a series of overlapping spiral segments.

In accordance with various embodiments, initial servo data are written to the respective media surfaces as a series of overlapping servo segments 130, as generally represented in FIG. 3. It is contemplated that the segments 130 are formed by the device 100 during a self servo-write operation. In other embodiments, however, some or all of the segments 130 may be generated in conjunction with a servo-track writer (STW) coupled to the device 100, or placed on the media 110 prior to installation of the media into the device 100.

The segments 130 are characterized as sets of servo data spirals that are successively written to the associated recording surface. An exemplary first set of spirals is generally denoted at 132. This first set begins adjacent an outermost diameter (OD) of the media surface and extends inwardly a selected distance across the radial width of the medium 110. Additional sets of spirals 134, 136 and 138 respectively successively extend inwardly across the media surface to the innermost diameter (ID) thereof. Segments 130 from each set form a series of discrete segmented spirals 140 that extend between the OD and the ID, as shown.

The segments in each successive set radially overlap the previous set, such as exemplified by overlap region 142 between the spiral sets 132 and 134. These overlap regions 142 advantageously provide servo data from both adjacent sets for servo control during the writing of final servo data in the vicinity of the segment seams.

While the segments 130 are depicted in FIG. 3 as being substantially linear in shape, this is for simplicity of illustration and is not required. Rather, when the device 100 self-writes the segments 130, it is contemplated that the segments 130 will more generally take a substantially curvilinear shape, as with conventional contiguous spirals that extend from OD to ID. The angular "wrap" of the segmented spirals 140 around the medium 110 may also be significantly increased as compared to that represented in FIG. 3

While four sets of spirals 132, 134, 136, 138 are depicted in FIG. 3, any suitable number of sets can be used depending on the requirements of a given application, including as few as two sets, or the use of 10 sets or more. Moreover, while a total of eight segmented spirals 140 are shown, it is contemplated that a significantly larger number of such spirals will be used, such as on the order of 200 or more.

In some embodiments, the successive sets of spirals 132, 134, 136, 138 are sequentially written across the medium 110 in a consistent direction (e.g., beginning at the OD and moving inwardly to the ID). However, the sets of spirals can alternatively be written in opposite radial directions; for example, the sets 132, 134 may be written while the associated transducer 112 is moved inwardly toward the ID, whereas the sets 136, 138 may be written while the associated transducer 112 is moved outwardly toward the OD.

In a device self-write mode, each segment 130 is generated by applying write current to the associated transducer 112 while continuously sweeping the transducer 112 across the media surface in accordance with a selected profile; in such case, the particular configuration of a given segment 130 will depend at least in part on the rotational speed of the medium 110 and the velocity of the transducer 112 during the segment writing operation.

Figure 4:
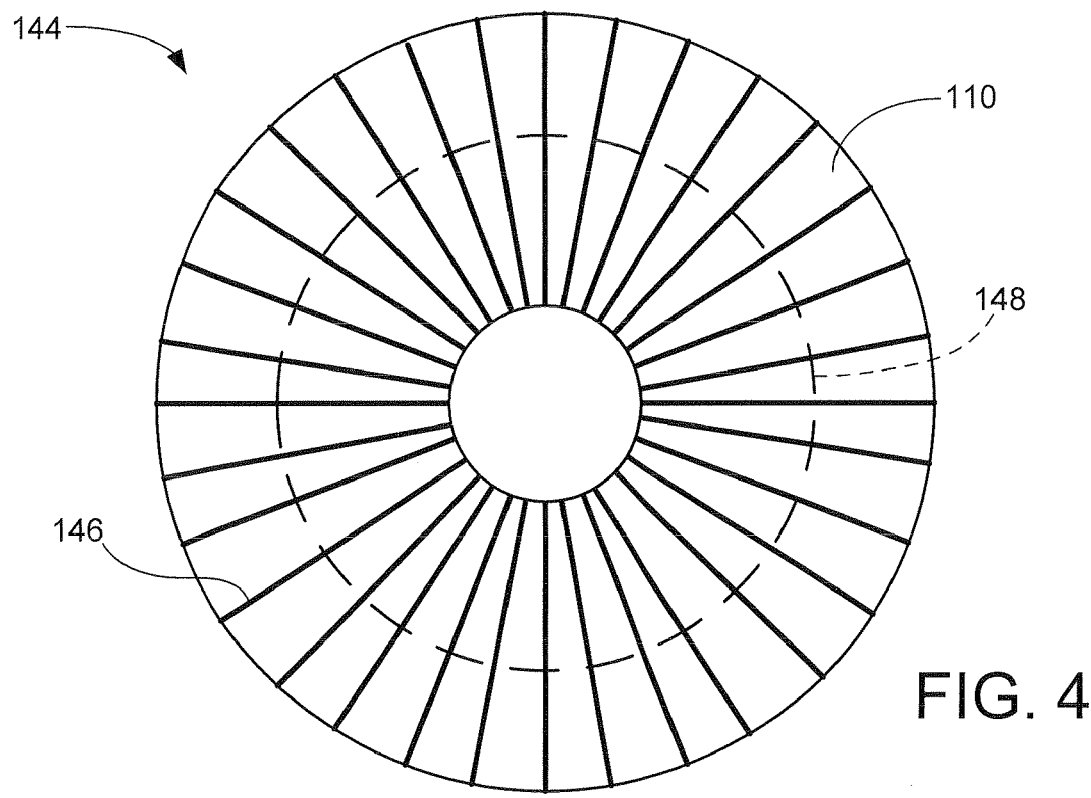
FIG. 4 generally illustrates final servo data written to the medium of FIG. 3 as a series of spaced apart servo wedges.

The segmented spirals 140 are thereafter used by the device 100 to generate final servo data 144, as generally represented in FIG. 4. The final servo data 144 are preferably characterized as a series of spaced apart servo wedges 146 that contiguously extend from OD to ID, like spokes of a wheel. The servo wedges 146 serve to define adjacent concentric servo data tracks on the media, such as generally represented at 148.

Each servo wedge 146 preferably includes synchronization, automatic gain control (AGC), header, track address (e.g., Grey code), and intra-track positional information (e.g., A-F dibit patterns). These respective fields are demodulated by the servo circuit 120 (FIG. 2) to control the positioning of the transducer 112 during I/O operations with user data sectors (not shown) in the regions between adjacent servo wedges 146. Preferably, the number of segmented spirals 140 is selected to be greater than the number of final embedded servo wedges 146, although such is not required.

Figure 5:
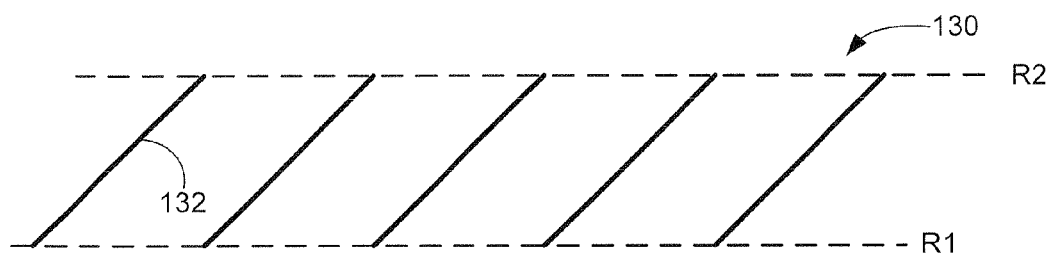
FIG. 5 shows a first set of spiral segments.

FIG. 5 generally illustrates the first set of spirals 132 from FIG. 3. The spirals 132 are written so as to extend from a first radius R1 to a second radius R2 of the medium 110. R1 corresponds to a suitable launching point, such as an OD limit stop position. R2 is selected in relation to the electromechanical properties of the device 100 with regard to nonrepeatable runout (NRRO) disturbance effects (e.g., measurement noise, perturbing torques to the actuator arm and spindle motor, etc.). Each of the spirals is written by asserting a write gate and streaming servo position data as the transducer 112 is swept across the medium 110.

As will be appreciated, deviation from average behavior will generally increase with time since launch of the spiral writing operation. The overall radial distance between R1 and R2 is accordingly selected to maintain the level of NRRO errors in the servo data within acceptable limits. Timing and position references are maintained during the writing of each successive spiral in the set 132 using appropriate disc locked clock techniques, such as by monitoring spindle motor back electromotive force (BEMF) zero crossings. An annular oscillating reference pattern at the OD (such as a 2T pattern) can also be written and used as desired to control the placement of each successive spiral.

Figure 6:
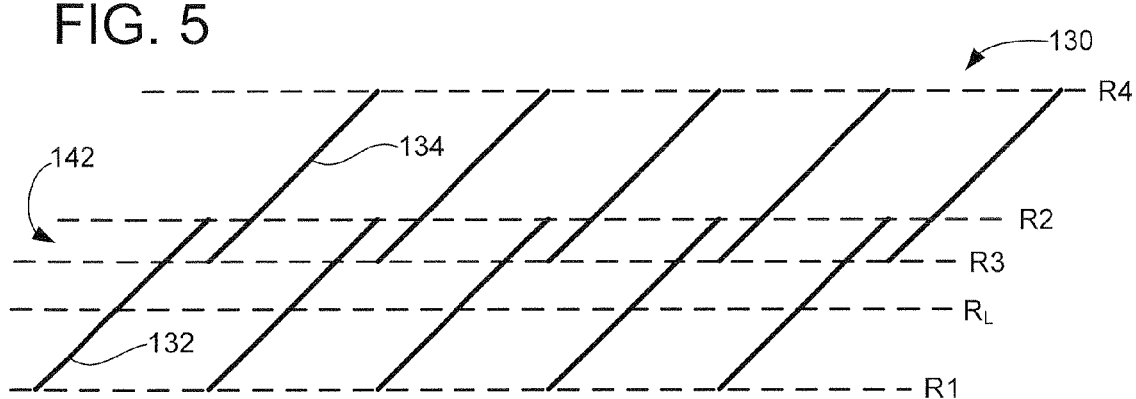
FIG. 6 shows a second set of spiral segments added to the segments of FIG. 5.

FIG. 6 shows the addition of the second set of spirals 134 from FIG. 3. The spirals 134 extend from a third radius R3 to a fourth radius R4, with the third radius R3 being disposed between radii R1 and R2. The aforementioned overlap region 142 in FIG. 3 corresponds to the radial distance between R2 and R3 in FIG. 6. The respective radial distances R3-R4 and R1-R2 are shown to be equal in FIG. 6, although such is not required; in alternative embodiments, the radial distance of each set of spirals is individually tuned to the mechanical properties of the device 100 in that region.

The second set of spirals 134 are written by servoing on the servo data of the first set of spirals 132. As explained more fully below, the transducer 112 is initially positioned at a launch radius $R_L$ between R1 and R3. A seek is initiated at this point to accelerate the transducer 112 toward the ID, and the writing of the associated spiral 134 commences at radius R3. Additional patterns can be written to the first set of spirals 132 to facilitate identification of the launch radius $R_L$.

The servo data of the spirals 134 are preferably altered as compared to the servo data of the spirals 132 to enable the servo circuit 120 to differentiate between the respective sets. For example, the spirals 134 can have an inversion of polarity phase as compared to the phase of the patterns of spirals 132. Alternatively, sync bits or other unique identifiers can be included in the respective patterns. Different spiral velocities and/or write frequencies can also be employed, as desired. In some embodiments, the adjacent spirals 132, 134 in a given overall segmented spiral 140 are placed as closely together as practical while still enabling the servo circuit to adequately transduce the respective servo data from each.

Figure 7:
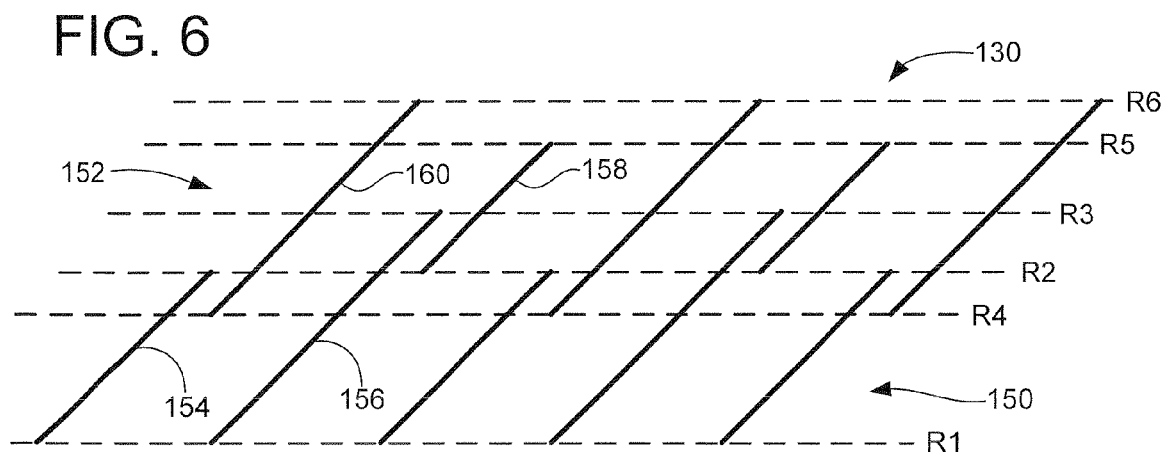
FIG. 7 shows an alternative arrangement of first and second sets of spiral segments.

FIG. 7 shows an alternative embodiment in which the spirals are provided with varying radial widths. A first set of spirals is generally denoted at 150 and a second, set of spirals is denoted at 152. The first set of spirals 150 include shorter spirals 154 which extend from a first radius R1 to a second radius R2, and longer spirals 156 which extend from R1 to R3. The respective shorter and longer spirals 152, 154 alternate in this embodiment (i.e., every other one is longer), although other arrangements can be used including arrangements that provide once-around index identification to the servo circuit 120.

Similarly, the second set of spirals 152 includes shorter and longer spirals 158, 160 which extend from R2 to R5 and R4 to R6, respectively. As before, other arrangements can readily be used as desired. The same or different launch points can be used for the writing of each of these spirals. The differences in overlap can be used for timing verification as well as to improve continuities in the final servo data 144 in the vicinity of the seams between adjacent sets 150, 152.

Figure 8:
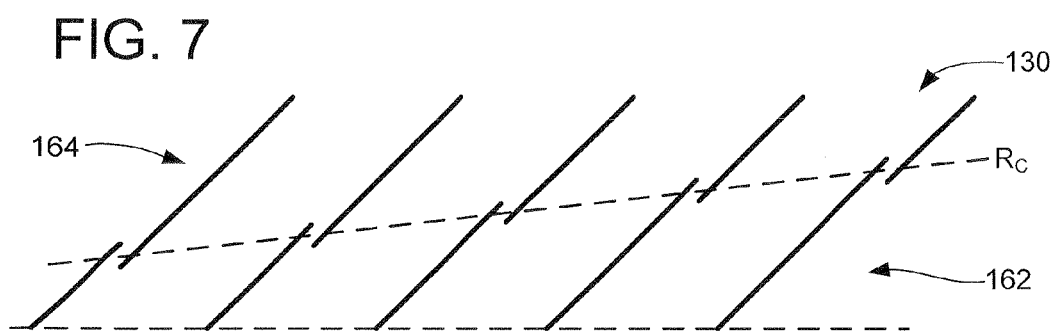
FIG. 8 shows another alternative arrangement of first and second sets of spiral segments.

FIG. 8 illustrates yet another alternative embodiment. In FIG. 8, first and second sets of spirals 162, 164 each have progressively longer spiral segments, resulting in a continuously varying, inwardly moving seam radius $R_S$. Other variations are also contemplated, including the incorporation of the different approaches of FIGS. 6-8 at different radii on the same medium 110.

Figure 9:
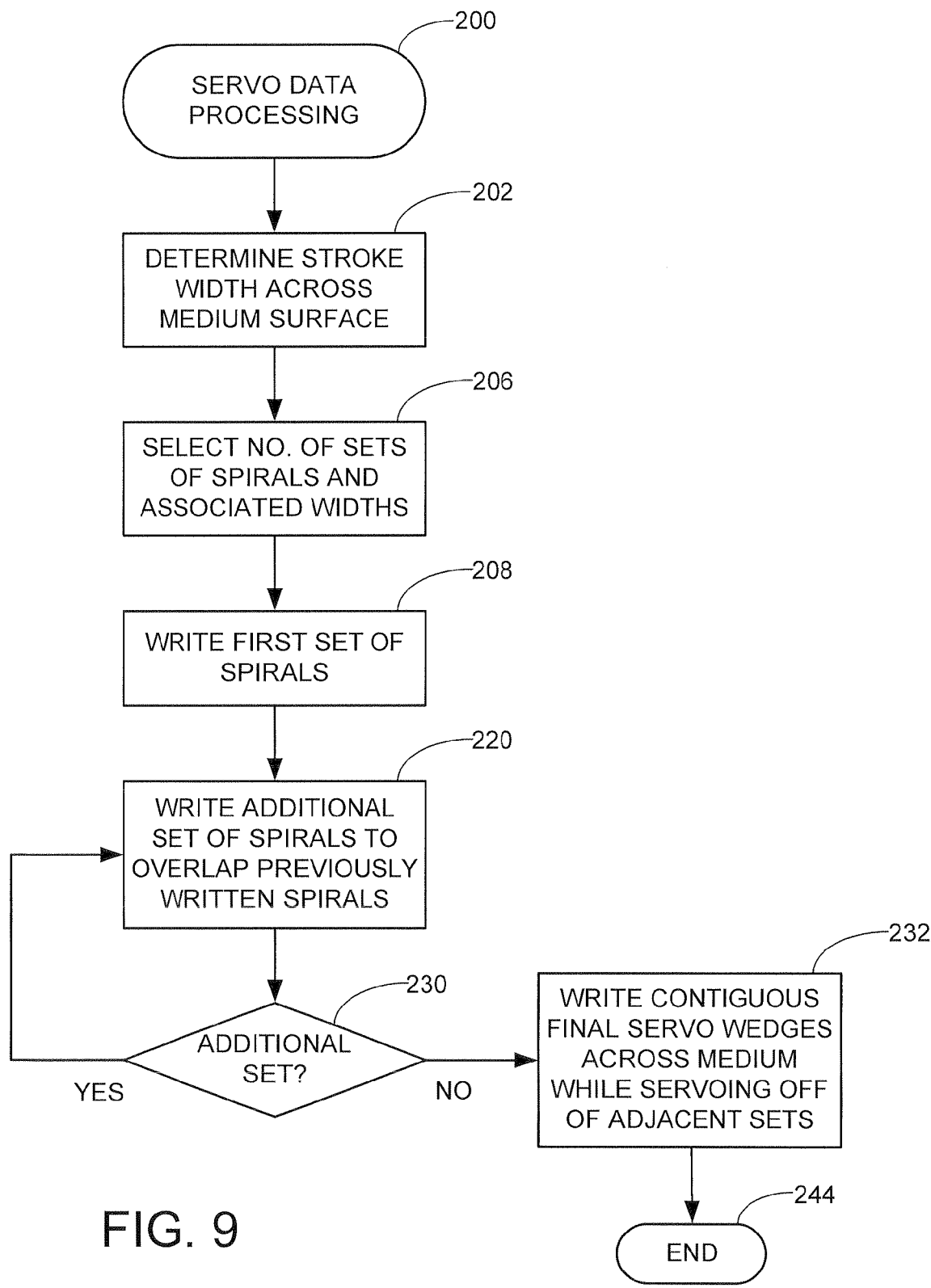
FIG. 9 provides a flow chart for a SERVO DATA PROCESSING routine, generally illustrative of steps carried out in accordance with various embodiments of the present invention to provide servo data for a control system such as the device of FIG. 1.

FIG. 9 sets forth a flow chart for a SERVO DATA PROCESSING routine 200, generally illustrative of steps carried out in accordance with various embodiments to place servo data on a medium. For purposes of the present discussion it will be contemplated that the routine 200 is carried out by the device 100 of FIG. 1 during a self-servo write operation during device manufacturing, although such is not limiting. As FIG. 9 describes the writing of servo data to a single storage medium surface of the device 100, it will be understood that the routine can be readily adapted to apply the servo data to each of the desired surfaces in turn, as desired. Programming steps illustrated by the routine 200 can be executed by a top level controller of the device 100 and/or a host computer (e.g., a PC) to which the device 100 is coupled.

Figure 10:
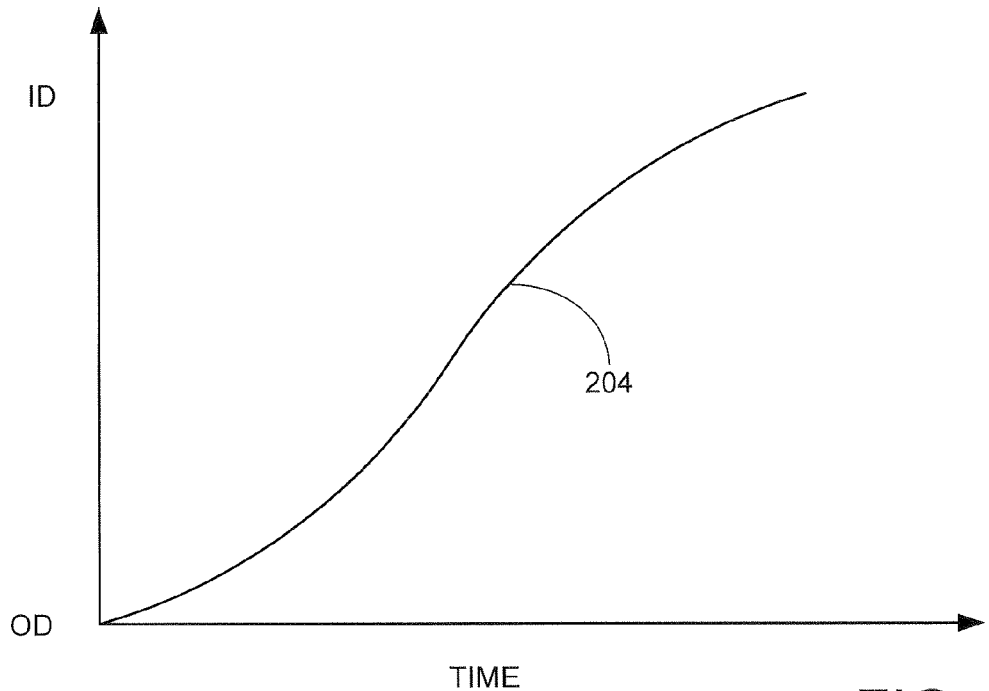
FIG. 10 shows positional displacement during a seek carried out by the routine of FIG. 9.

At step 202, the available stroke width across the associated medium surface is first determined. This is carried out to accurately identify the available stroke, or radial distance, available to store the final servo data 144 across the recording surface. As shown by a seek displacement curve 204 in FIG. 10, the transducer 112 is initially biased against an outermost limit stop adjacent the OD. A seek is performed in accordance with a selected seek profile to advance the transducer 112 to a position adjacent an innermost limit stop at the ID.

The seek current (or other related value) is integrated during the seek and the second limit stop is detected in relation to a substantial change in the integrated value. Multiple such seeks are preferably carried out in both directions to determine the overall stroke length and associated boundary OD and ID positions. This allows determination of the associated number of servo data tracks to be written, as well as target width and placement values, etc.

The routine of FIG. 9 continues at step 206 to select the number of sets of spirals and the associated radial widths thereof. This step can take into account mechanical response characteristics of the system determined during step 202, as well as empirical evaluation of the system including detected reader/writer offsets at different radii across the surface.

A first set of spirals is next written to the medium 110 at step 208, such as the set 132 in FIG. 5. The first set of spirals can be written as described above by establishing timing and position references, and then using these references to successively launch write seeks from a fixed radial position.

Figure 11:
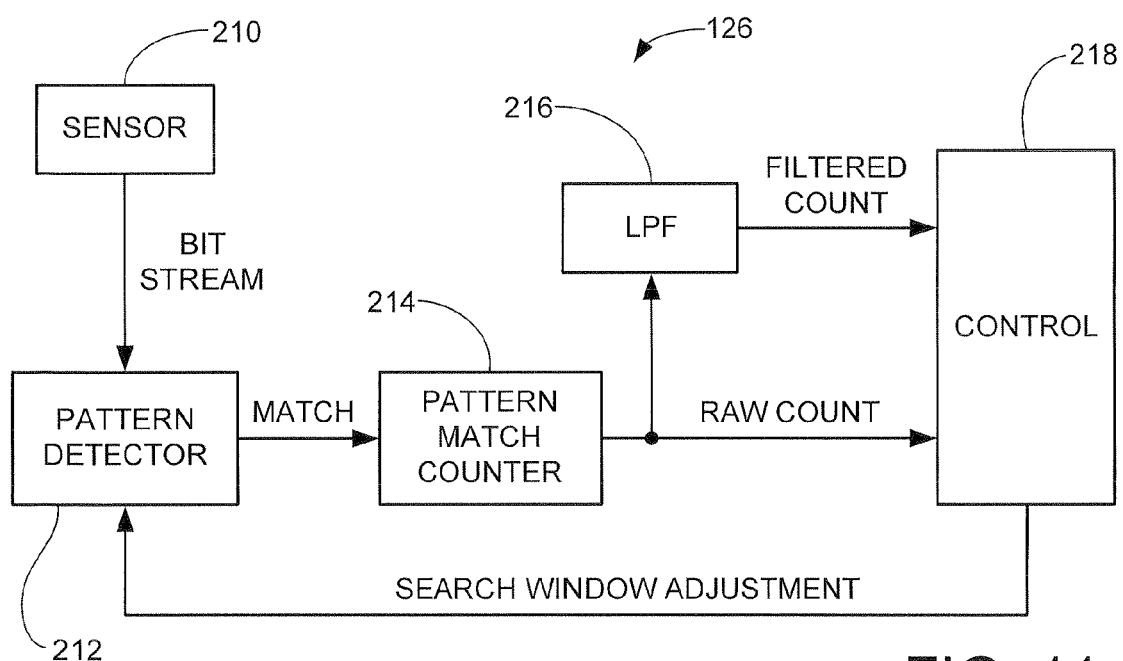
FIG. 11 is a functional representation of portions of the servo circuit of FIG. 2 operative during the routine of FIG. 9.

A sliding window approach is utilized to detect the reference patterns such as generally set forth by FIG. 11. A sensor block 210 provides an initially transmitted bit stream to a pattern detector block 212. The detector block 212 is preferably characterized as a matched filter and operates to examine the input bit stream to detect the reference pattern at the associated reference frequency. When the pattern detector block 212 captures a selected portion of the reference pattern at the reference frequency over a sliding interval, the block 212 outputs a match count to increment a pattern match counter 214.

The incremented counts of the counter 214 are filtered by a low pass filter (LPF) 216, and both the raw counts and the filtered counts are provided to a control block 218 as shown. The control block 218 operates to maintain lock with the reference pattern, as well as to adaptively adjust the durations of the respective search windows for subsequent spirals.

Figure 12:
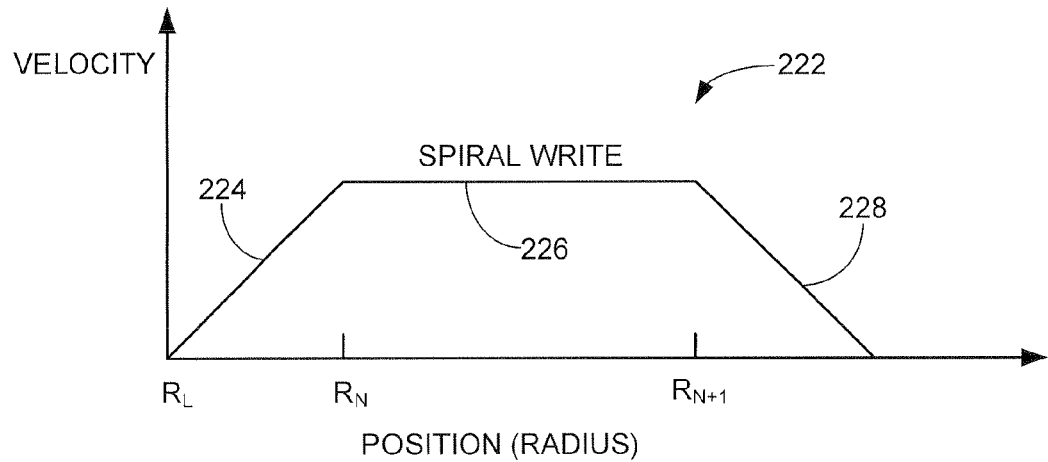
FIG. 12 shows a velocity curve during the writing of a selected set of spiral segments.

The next set of spirals is written to the medium 110 at step 220 in FIG. 9, such as the second set 134 in FIGS. 6-7. A suitable seek profile is preferably used to write each spiral in turn, as set forth by velocity profile 222 in FIG. 12. Once an appropriate launch radius (RL) has been established, the transducer 112 is accelerated (segment 224) to a selected write velocity (segment 226). The spiral segment is written between the respective radial boundaries ($R_N$ and $R_{N+1}$) while the transducer is maintained at the selected write velocity.

The transducer 112 is then decelerated (segment 228) and returned to the launch radius $R_L$ for the writing of the next segment. Rotational latencies may result in the segments being written in a staggered fashion until all of the spirals in the set 134 have been completed.

Preferably, the point at which the write motion is initiated is selected so as to avoid collisions/overwrites with spirals from different sets. The launch radius and/or the acceleration pulse can be set globally for each set of spirals, or can be individually adjusted. The launch timing is set using the aforementioned disc locked clock timing mechanism.

Continuing with the routine of FIG. 9, decision step 230 determines whether one or more additional sets of spirals need be written; if so, process step 220 is repeated the appropriate number of times until segmented spirals (140 in FIG. 3) fully extend across the media surface. Thereafter, the final servo data are written at step 232 while servoing off of the segmented spirals 140.

The final servo data write operation of step 232 preferably begins at a selected radial extent of the media surface (e.g., adjacent the OD) and works stepwise across the media surface to the other radial extent (e.g., the ID). Multiple passes for each servo track are preferably taken to stitch together and/or trim the servo data written during a previous revolution. The initial servo data from the segmented spirals 140 are read and used to establish the appropriate positions and timing at which the final servo data are written.

Figure 13:
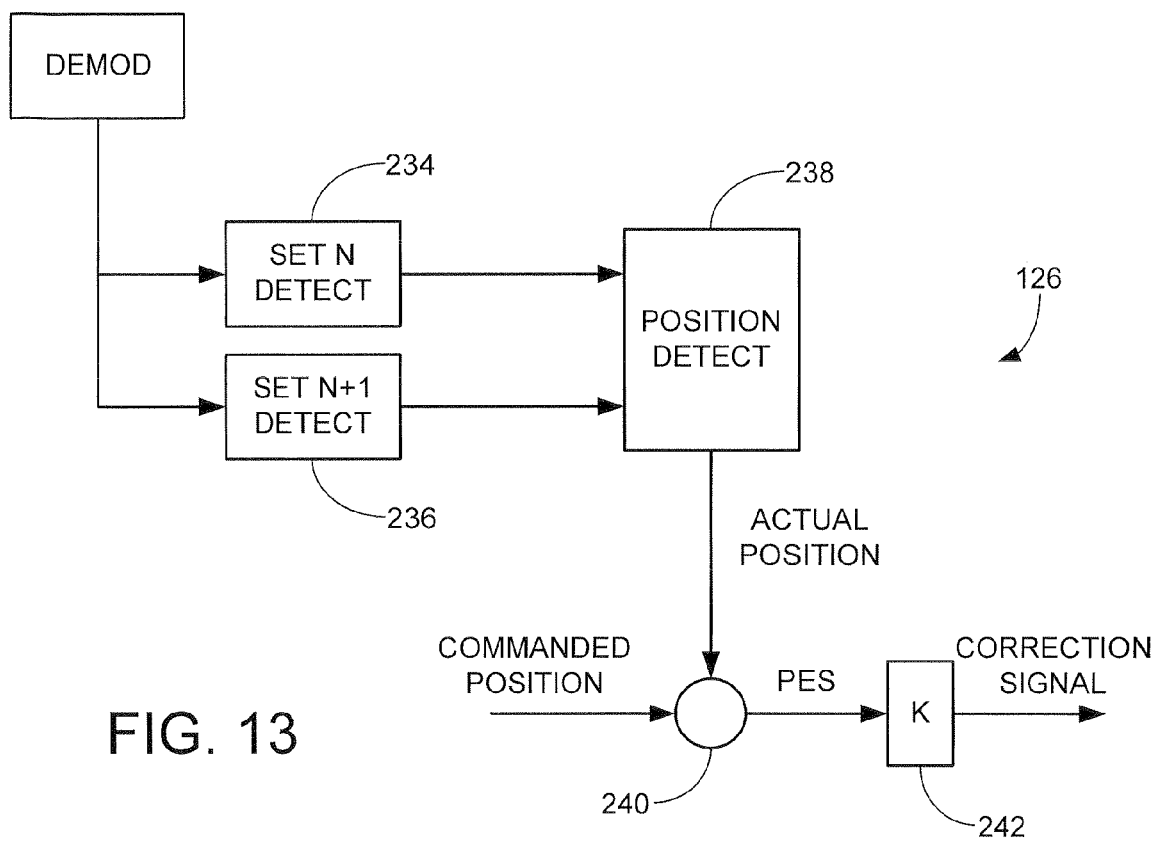
FIG. 13 is a functional representation of portions of the servo circuit of FIG. 2 operative during the routine of FIG. 9.

In the overlap regions (e.g., 142 in FIGS. 3 and 6), the initial servo data are available from both N and N+1 sets of adjacent spirals (e.g., 132 and 134 in FIGS. 3 and 6). The servo controller (126, FIG. 2) is preferably configured to detect both sets, as shown by respective detection blocks 234, 236 in FIG. 13. A position detection and transition block 238 receives the associated patterns and determines an actual radial position of the transducer 112 therefrom. The actual position is combined with a commanded position at summing junction 240 to establish a position error signal (PES). The PES in turn is combined with a gain value K at block 242 to provide a correction signal that is fed to the VCM driver circuitry 128 (FIG. 2).

The block 238 operates to ensure smooth transition from one set of spirals to the next. In some embodiments, primary servo control is maintained on the Nth set of spirals while measurements are made of the overlapping N+1 set to evaluate any timing or positional incoherence between the respective sets. At an appropriate point, primary servo control is transitioned to the N+1 set in such a way as to maintain timing integrity and coherence in the associated final servo data being written.

In a related embodiment, the block 238 applies a suitable weighting value to each set. The weighting values can be mutually adjusted over a number of track widths so that the actual position output by the block 238 transitions slowly from primary reliance on the Nth set to the N+1 set. This further enhances positional and timing coherence in the final servo wedges 146 (FIG. 4) at the seam regions. More complex transitioning can also be implemented, including the use of varying overlap regions such as previously discussed in FIGS. 7 and 8.

The concurrent servoing on sets N and N+1 during the writing of the final servo data enable accurate assessments of other factors that can affect the writing of the final servo data, such as verification of reader/writer offsets within the transducer, the identification of suitable RRO compensation values, and radial spacing ratio values to be applied once the system transitions fully to the N+1 set to assure servo tracks are written at a consistent track width across the medium 110.

Once the final servo wedges 146 have been written, the segmented spirals 140 that have not already overwritten by the wedges 146 are preferably erased at the end of step 232, thereby facilitating the subsequent formation of data sectors in the regions between adjacent wedges. The routine then ends at step 244.

Figure 14:
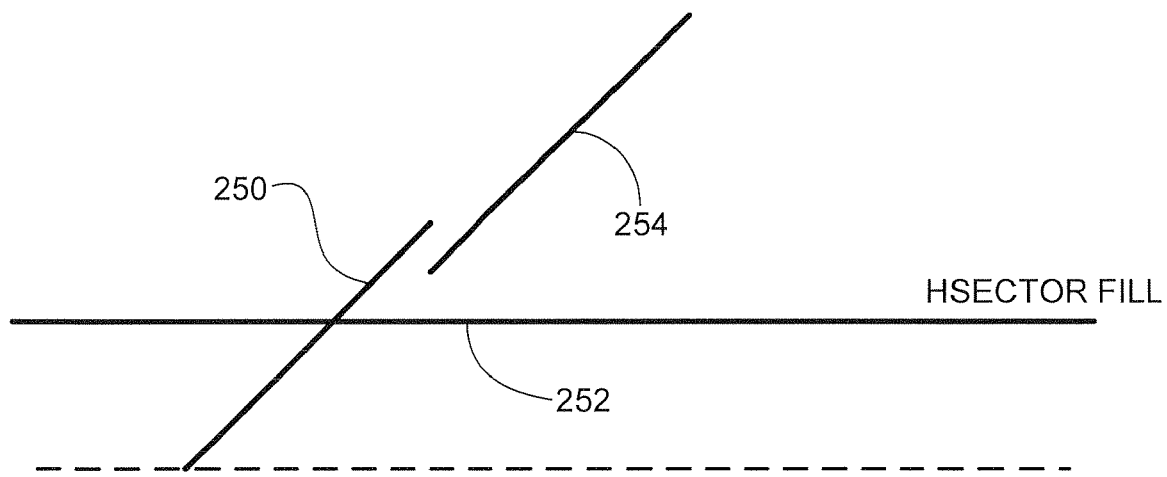
FIG. 14 illustrates an alternative embodiment in which continuously extending servo data are additionally written to the storage medium.

It will be appreciated that numerous variations are possible in view of the foregoing discussion, depending on the requirements of a given application. In FIG. 14, a first set of spirals 250 are written to the medium, followed by the writing of radially extending servo data 252 at an appropriate location such as the launch radius $R_L$ for a second set of spirals 254.

The servo data 252 in FIG. 14 are characterized as continuously extending servo data, such as HSECTOR FILL data, in which regularly repeating servo data are continuously written around the circumference of the medium 110 at the desired radius. The data 252 can include header, GC and/or trimmed dibit patterns to facilitate accurate placement of the transducer 112 during launches used to write the second set of spirals 254. The data 252 are overwritten during the subsequent final servo data write operation (step 232 in FIG. 9).

Figure 15:
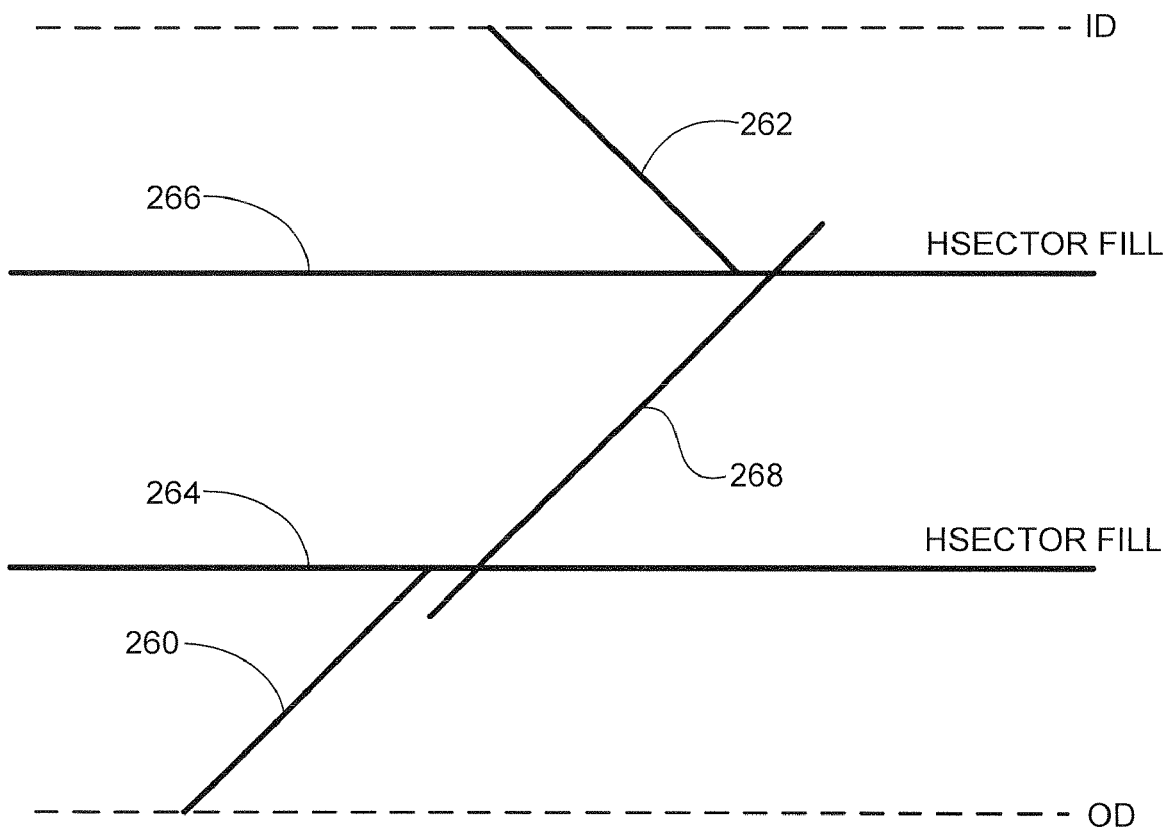
FIG. 15 provides another alternative embodiment in which respective sets of spirals are written in opposing radial directions across the medium.

FIG. 15 shows another alternative embodiment in which a first set of spirals 260 are written inwardly from the OD and a second set of spirals 262 are written outwardly from the ID. As the medium 110 is contemplated as rotating in the same rotational direction during the writing of both sets of spirals 260 and 262, the respective sets will accordingly project in opposing directions across the medium surface, as shown.

FIG. 15 further shows continuously extending servo data 264, 266 written at the terminal ends of the sets 260, 262. A third set of spirals 268 are thereafter written to bridge the first and second sets.

Figure 16:
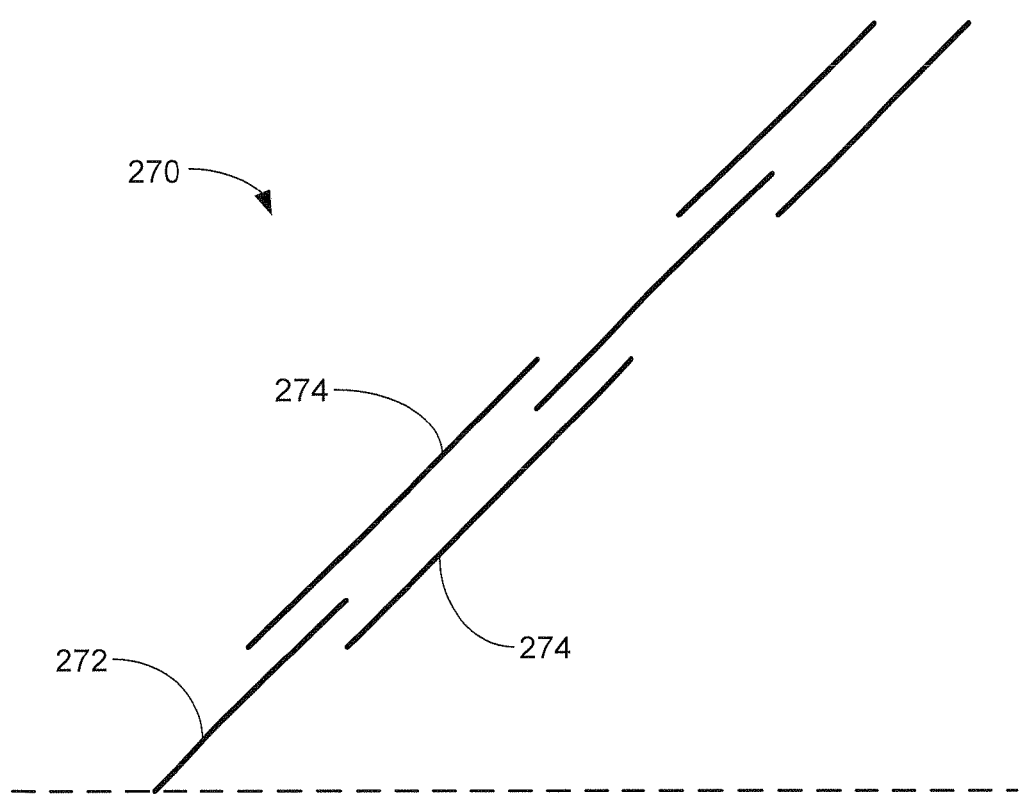
FIG. 16 illustrates another embodiment that uses a segmented spiral configuration.
Figure 17:
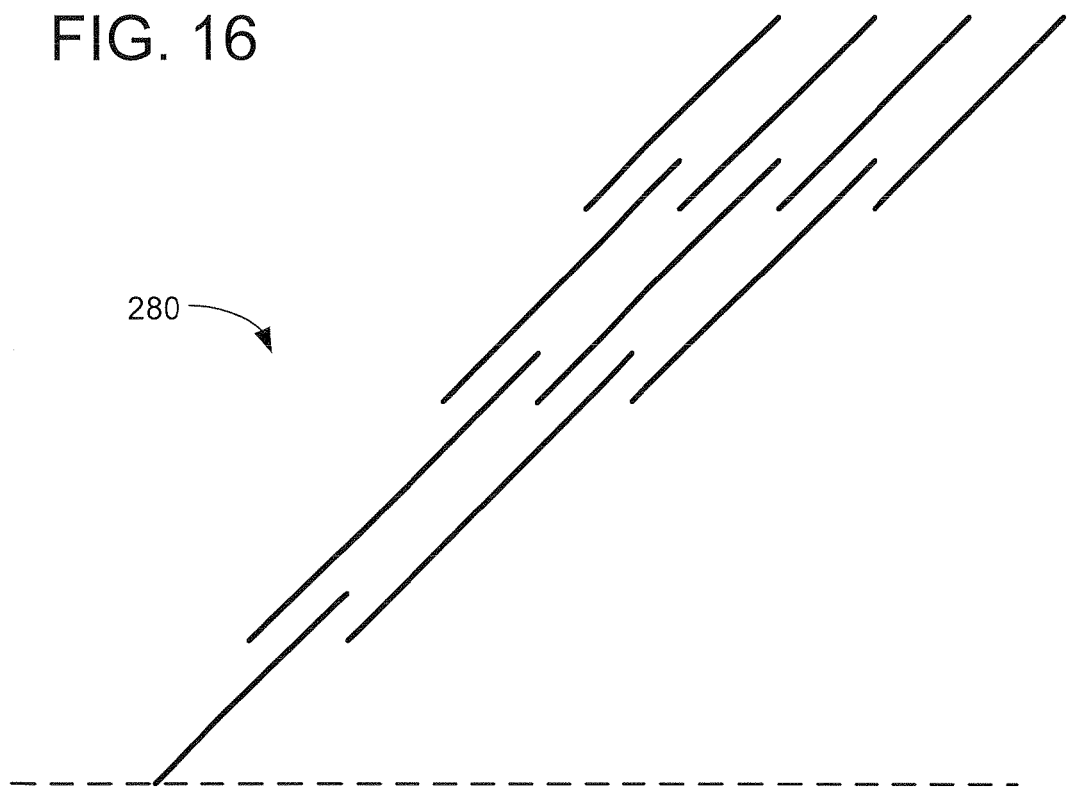
FIG. 17 provides another embodiment that uses an alternative segmented spiral configuration.

FIGS. 16 and 17 set forth embodiments in which different numbers of segments are provisioned in each set of spirals. FIG. 16 illustrates segmented spiral configuration 270 in which a first set of spiral 272 contributes a single segment, a second set of spirals 274 contributes two adjacent segments, and so on. This can advantageously provide additional servo resolution at selected areas on the medium.

FIG. 17 provides another segmented spiral configuration 280 in which successive sets of spirals contribute increasing numbers of segments (in this case 1, 2, 3, 4 etc.). Other configurations of overlapped spiral segments can be used as desired.

Empirical analysis indicates that open loop seeks as disclosed herein (see e.g., FIG. 12) are suitably accurate and repeatable to implement the foregoing embodiments in a wide range of environments. Since error generally tends to propagate the farther away the transducer is from the launching point, detected servo quality can be used as a factor in deciding at which point, and how smoothly, a transition is carried out to the next set of spirals.

Accordingly, it will be appreciated that the foregoing embodiments reduce the effects of propagated error by using shorter, segmented spirals, and provide improved final servo data quality at seam boundaries by servoing on both adjacent sets of spirals.

It will be understood that even though numerous characteristics and advantages of various embodiments of the invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
  generating spaced apart, first servo spirals on a storage medium with a radial width less than an overall radial width of the medium;
  writing spaced apart, second servo spirals to the medium that overlap the first servo spirals along an overlap region; and
  writing final servo data to the medium while servoing on both the first and second servo spirals in the overlap region.

2. The method of claim 1, wherein the first servo spirals comprise a series of spaced apart spiral segments each extending from a first radius to a second radius of the medium, wherein the second servo spirals comprise a series of spaced apart spiral segments each extending from a third radius between the first radius and the second radius to a fourth radius of the medium, and wherein the overlap region extends from the second radius to the third radius.

3. The method of claim 2, wherein the first servo spirals further comprise a second series of spaced apart spiral segments that extend beyond the second radius.

4. The method of claim 1, wherein the second set of spirals are written by initiating a seek to move a transducer across the medium while asserting a write gate to continuously write servo data to the medium.

5. The method of claim 1, wherein the servoing of the second writing step comprises transducing servo data from both the first and second sets of spirals to generate a position signal indicative of a radial position of the transducer.

6. The method of claim 5, wherein the respective servo data from the first and second sets of spirals are each respectively assigned an associated weight during generation of the position signal.

7. The method of claim 6, wherein the associated weights inversely transition as the transducer progresses in a direction away from the first set of spirals and toward the second set of spirals during the writing of the final servo data.

8. The method of claim 1, wherein the first set of spirals is generated by a data storage device during a self servo-write operation using a succession of open loop seeks from a fixed boundary position.

9. The method of claim 1, wherein the second set of spirals are written with a polarity phase opposite that of the first set of spirals.

10. The method of claim 1, wherein the second set of spirals are written at a different frequency than that used to write the first set of spirals.

11. The method of claim 1, wherein the first set of spirals are written while a transducer is moved from an outermost diameter (OD) of the medium in a direction toward an innermost diameter (ID) of the medium, and wherein the second set of spirals are written while the transducer is moved from the ID in a direction toward the OD.

12. The method of claim 1, wherein the generating step further comprises writing continuously extending servo data to extend continuously around the medium at a selected radius while servoing on the first servo spirals, and wherein the second servo spirals are further written while servoing on the continuously extending servo data.

13. An apparatus comprising a controller configured to generate spaced apart, first servo spirals on a storage medium with a radial width less than an overall radial width of the medium, to write spaced apart, second servo spirals to the medium that overlap the first servo spirals along an overlap region, and to write final servo data to the medium while servoing on both the first and second servo spirals in the overlap region.

14. The apparatus of claim 13, wherein the first servo spirals comprise a series of spaced apart spiral segments each extending from a first radius to a second radius of the medium, wherein the second servo spirals comprise a series of spaced apart spiral segments each extending from a third radius between the first radius and the second radius to a fourth radius of the medium, and wherein the overlap region extends from the second radius to the third radius.

15. The apparatus of claim 14, wherein the first servo spirals further comprise a second series of spaced apart spiral segments that extend beyond the second radius.

16. The apparatus of claim 13, wherein the controller directs the writing of the second set of spirals by initiating an open loop seek to move the transducer across the medium while asserting a write gate to continuously write servo data to the medium.

17. The apparatus of claim 13, wherein the controller generates a position signal indicative of a radial position of the transducer in relation to transduced servo data from both the first and second sets of spirals while the transducer is disposed in the overlap region.

18. The apparatus of claim 13, further comprising said storage medium and a data transducer adjacent the storage medium.

19. An apparatus comprising:
a data transducer adjacent a storage medium; and
first means for using the data transducer to generate spaced apart, first servo spirals on the storage medium with a radial width less than an overall radial width of the medium, to write spaced apart, second servo spirals to the medium that overlap the first servo spirals along an overlap region, and to write final servo data to the medium while servoing on both the first and second servo spirals in the overlap region.

20. The apparatus of claim 19, wherein the first means is characterized as a servo controller of a data storage device.

* * * * *